United States Patent
Mhaskar et al.

(10) Patent No.: US 10,554,618 B2
(45) Date of Patent: Feb. 4, 2020

(54) DOMAIN IDENTIFIER BASED ACCESS POLICY CONTROL

(71) Applicant: Avaya Inc., Santa Clara, CA (US)

(72) Inventors: Hemadri Mhaskar, Nagpur (IN); Arunkumar Radhakrishnan Geethananthan, Bangalore (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/911,064

(22) Filed: Mar. 2, 2018

(65) Prior Publication Data
US 2019/0273715 A1    Sep. 5, 2019

(51) Int. Cl.
| H04L 29/12 | (2006.01) |
| H04L 12/733 | (2013.01) |
| H04L 12/715 | (2013.01) |
| H04L 12/24 | (2006.01) |
| H04L 12/741 | (2013.01) |
| H04L 12/46 | (2006.01) |

(52) U.S. Cl.
CPC .......... *H04L 61/2007* (2013.01); *H04L 12/46* (2013.01); *H04L 41/0806* (2013.01); *H04L 41/0893* (2013.01); *H04L 45/04* (2013.01); *H04L 45/122* (2013.01); *H04L 45/745* (2013.01); *H04L 61/6022* (2013.01)

(58) Field of Classification Search
CPC . H04L 12/46; H04L 41/0806; H04L 41/0893; H04L 45/04; H04L 45/122; H04L 45/745; H04L 61/2007; H04L 61/6022
See application file for complete search history.

(56) References Cited

U.S. PATENT DOCUMENTS

| | | | | |
|---|---|---|---|---|
| 2007/0019558 A1* | 1/2007 | Vasseur | ............... | H04L 41/5022 370/248 |
| 2012/0124640 A1* | 5/2012 | Bender | ............... | G06F 21/6218 726/1 |
| 2013/0315102 A1* | 11/2013 | Kahng | ................... | H04L 61/103 370/254 |
| 2014/0064283 A1* | 3/2014 | Balus | ....................... | H04L 49/70 370/392 |
| 2014/0075049 A1* | 3/2014 | Liu | .......................... | H04L 41/04 709/244 |
| 2015/0138993 A1* | 5/2015 | Forster | .................... | H04L 41/12 370/248 |
| 2016/0036687 A1* | 2/2016 | Brown | .................. | H04W 88/16 370/401 |
| 2016/0065503 A1* | 3/2016 | Yohe | ....................... | H04L 49/70 370/389 |

* cited by examiner

Primary Examiner — Benjamin H Elliott, IV

(57) ABSTRACT

Methods, systems and computer readable media for domain identifier (ID) based access policy control are described.

18 Claims, 5 Drawing Sheets

DOMAIN IDENTIFIER BASED ACCESS POLICY CONTROL

TECHNICAL FIELD

Embodiments relate generally to computer networks, and more particularly, to methods, systems and computer readable media for domain identifier (domain ID) based access policy control.

BACKGROUND

Controlling accessibility between multiple data centers can present challenges. Some existing techniques such as ADV-RTR (router advertisement messages), ISID (service identifiers), and route-map constructs may require burdensome configuration and numerous host entries programmed into data paths. For example, a backbone route map may accept all routes for specified Level 3 (L3) ISIDs from all domains. Consequently, a large number of ADV-RTR and ISID based accept policies may be needed if routes need to be accepted from only one or a few data centers from among the data centers that share a same set of L3 ISIDs.

Embodiments were conceived in light of the above mentioned needs, problems and/or limitations, among other things.

SUMMARY

In general, some implementations can provide a method comprising assigning a first domain ID to a first network device, and assigning a second domain ID to a second network device, the second domain ID being different than the first domain ID. The method can also include connecting the first network device to the second network device via a network-to-network interface. The method can further include exchanging one or more routing messages between the first network device and the second network device via the network-to-network interface, wherein the one or more routing messages include a domain ID corresponding to a domain ID for which messages are to be accepted.

The method can also include installing one or more routes at the first network device or the second network device based on corresponding domain ID accept policies, and selectively accepting or denying routes based on domain ID.

In some implementations, the network-to-network interface includes a network-to-network interface (NNI) connection in a shortest path bridging network. The method can also include connecting the first network device and the second network device to a network. The method can further include connecting the first network device and the second network device to an L3 virtual switching network.

The one or more routing messages can include backbone messages (e.g., distributed virtual routing (DVR) backbone messages). The backbone messages can include one or more of host route information, domain ID, L3VSN ID, or host MAC address.

Some implementations can include a system comprising one or more processors coupled to a nontransitory computer readable medium having stored thereon on software instructions that, when executed by the one or more processors, cause the one or more processors to perform operations. The operations can include assigning a first domain ID to a first network device, and assigning a second domain ID to a second network device, the second domain ID being different than the first domain ID. The operations can also include connecting the first network device to the second network device via a network-to-network interface, and exchanging one or more routing messages between the first network device and the second network device via the network-to-network interface, wherein the one or more routing messages include a domain ID corresponding to a domain ID for which messages are to be accepted. The operations can further include installing one or more routes at the first network device or the second network device based on corresponding domain ID accept policies, and selectively accepting or denying routes based on domain ID.

In some implementations, the network-to-network interface can include a network-to-network interface (NNI) connection in a shortest path bridging network. The operations can also include connecting the first network device and the second network device to a network. The operations can further include connecting the first network device and the second network device to an L3 virtual switching network.

The one or more routing messages can include one or more backbone messages. The one or more backbone messages can include one or more of host route information domain ID, L3VSN ID, or host MAC address.

Some implementations can include a nontransitory computer readable medium having stored thereon software instructions that, when executed by one or more processors, cause the one or more processors to perform operations. The operations can include assigning a first domain ID to a first network device, and assigning a second domain ID to a second network device, the second domain ID being different than the first domain ID. The operations can also include connecting the first network device to the second network device via a network-to-network interface, and exchanging one or more routing messages between the first network device and the second network device via the network-to-network interface, wherein the one or more routing messages include a domain ID corresponding to a domain ID for which messages are to be accepted. The operations can further include installing one or more routes at the first network device or the second network device based on corresponding domain ID accept policies, and selectively accepting or denying routes based on domain ID.

In some implementations, the network-to-network interface can include a network-to-network interface (NNI) connection in a shortest path bridging network. The operations can also include connecting the first network device and the second network device to a network. The operations can further include connecting the first network device and the second network device to an L3 virtual switching network.

The one or more routing messages can include one or more backbone messages. The one or more backbone messages can include one or more of host route information domain ID, L3VSN ID, or host MAC address.

DETAILED DESCRIPTION

In general, in some implementations, a user or system can selectively accept routes for an L3 ISID from a data center and deny routes for a same L3 ISID from another data center. Accept policies based on domain ID can be created and used to accept host routes from a specified datacenter, for example. Additional accept policy granularity can be provided by creating domain ID and ADV-RTR based accept policies to accept routes from specific ADV-RTRs belonging to specific domains while denying routes from other ADV-RTRs.

The domain ID can include an additional layer that augments an accept policy infrastructure. For example, by augmenting an accept policy infrastructure, an implementation of the domain ID based access control can provide domain ID based policing to augment various techniques such as ISID, ISID-LIST (service identifiers (ISIDs) specified for service groups), or ADV-RTR, or any combination thereof.

Some implementations provide a technical advantage of an ability to selectively accept or drop route entries (and corresponding traffic streams) from different datacenters by identifying them individually using the domain ID associated with a respective datacenter. For example, some implementations may be used with data centers having a system such as Distributed Virtual Routing (DVR) provided by Avaya, Inc. The domain ID based access policy control system and method disclosed herein can reduce hardware resource utilization (e.g., no hardware application specific ICs are required and/or little or no datapath resource utilization) and configuration requirements. Some implementations provide policing over domains and thus may provide better control of which host routes are programmed into a datapath.

In contrast to the disclosed subject matter, prior solutions may use a route-map construct (e.g., backbone route map) that either accepts all host routes for an L3 ISID from all datacenters (e.g., from all domain IDs) or may require a large amount ADV-RTR accept policies to filter out required host routes from different datacenters.

It will be appreciated that a network having DVR is described herein for the purpose of non-limiting illustration of example implementations of the disclosed subject matter. Implementations of the disclosed subject matter can be used with networks other than those provided with DVR.

Figure 1:
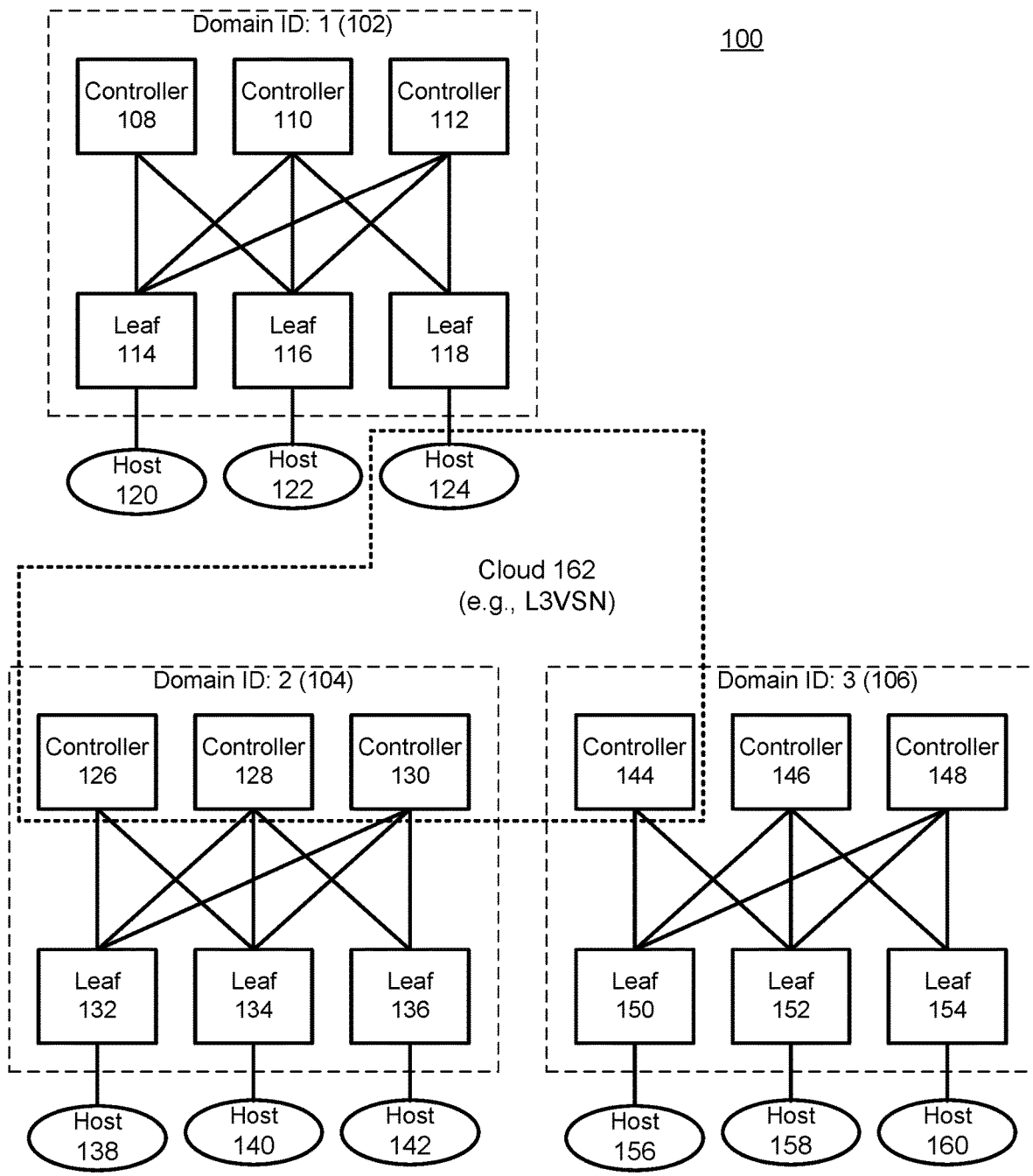
FIG. 1 is a diagram of an example network environment in accordance with some implementations.

FIG. 1 is a diagram of an example network environment 100 in accordance with some implementations. The environment includes three data centers (102, 104, and 106) each having a respective domain ID (e.g., 1, 2, and 3). The three data centers (102, 104, and 106) are connected by a cloud network 162 (e.g., a Level 3 virtual switching network or L3VSN, Shortest Path Bridging fabric network, or the like).

The first data center 102 having Domain ID 1 includes a plurality of controllers 108-112, a plurality of leaf nodes 114-118, and a plurality of hosts 120-124. The second data center 104 having Domain ID 2 includes a plurality of controllers 126-130, a plurality of leaf nodes 132-136, and a plurality of hosts 138-142. The third data center 106 having Domain ID 3 includes a plurality of controllers 144-148, a plurality of leaf nodes 150-154, and a plurality of hosts 156-160.

As shown in FIG. 1, a domain can include a group of DVR leaf nodes (e.g., nodes 114-118) and DVR controller nodes (e.g., controllers 108-112) in a data center network. A domain ID is a unique identifier (e.g., an alphanumeric identifier, encoded value, or other suitable identifier) associated with a group of DVR leaf nodes and DVR controller nodes. The domain ID can be configured on each DVR leaf node and DVR controller node within the group to identify the domain that the leaf and controller nodes belong to. As shown in FIG. 1, multiple data center networks can have different domain IDs and be connected via L3VSN, Shortest Path Bridging fabric network or the like. Alternatively, or additionally, multiple domains (e.g., having multiple, different domain IDs) can exist within a single data center network.

In operation, the controllers (108-112) in the data center having domain ID 1 (102) can accept routes from domain IDs 2 and 3 (i.e., data centers 104 and 106) based on domain ID accept policies. The controllers (126-130) in the data center having domain ID 2 (104) can accept routes from domain IDs 1 and 3 (i.e., data centers 102 and 106) based on domain ID accept policies. The controllers (144-148) in the data center having domain ID 3 (106) can accept routes from domain IDs 1 and 2 (i.e., data centers 102 and 104) based on domain ID accept policies, which can include a list of one or more rules that define which domain IDs that network traffic is to be accepted from and/or which domain IDs network traffic is not to be accepted from.

In some implementations, a user (e.g., a human operator or another computer system) can create domain ID based accept policies through configuration of a DVR controller or the like. A domain ID can include an attribute in a virtual routing solution such as the DVR provided by Avaya, Inc., which is based on shortest path bridging (SPB) technology. When used with a DVR equipped system, no additional tables need to be created to accommodate domain IDs. Accept policies within a DVR environment can include a domain ID attribute for filtering routes.

Figure 2:
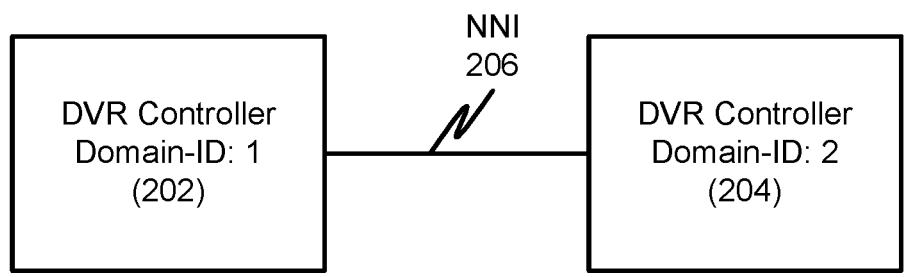
FIG. 2 is a diagram of an example domain controller arrangement in accordance with some implementations.

FIG. 2 is a diagram of an example domain controller arrangement showing a first DVR controller 202, a second DVR controller 204, and a network-to-network interface 206 (NNI) that connects the first and second DVR controllers. As shown in FIG. 1, multiple domains may be connected to a virtual switching network (e.g., 162). The network can also include network-to-network interfacing as shown in FIG. 2. Route sharing between domains can be performed using DVR backbone messages that can include the following information: host Internet Protocol (IP) address, domain ID, L3VSN/VRF ID, and host MAC address. The DVR controllers (e.g., 202 and 204) can program host routes in their respective routing information bases per the respective domain ID based accept policies.

Figure 3:
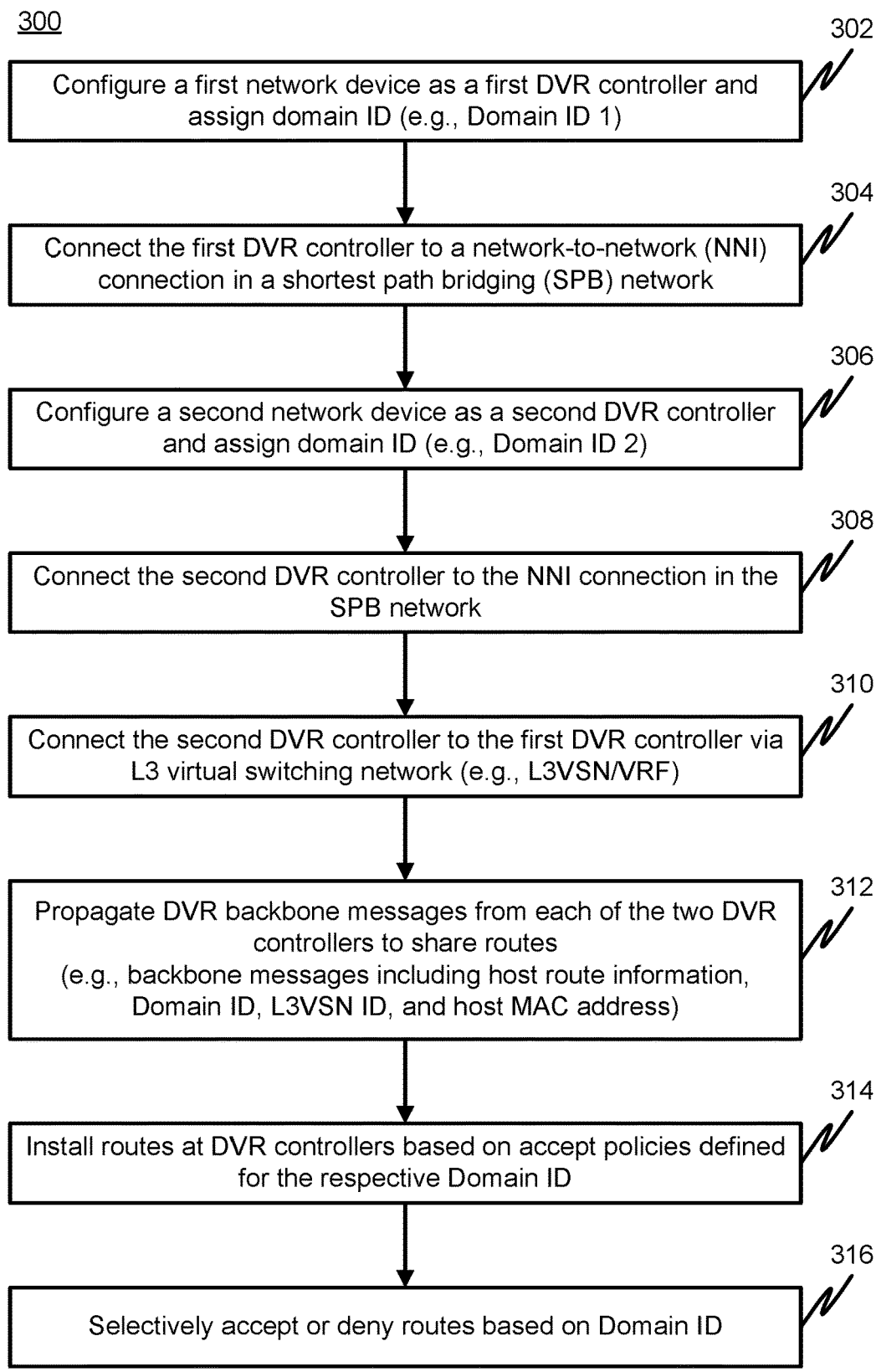
FIG. 3 is a flowchart showing an example domain ID based access policy control method in accordance with some implementations.

FIG. 3 is a flowchart showing an example domain ID based access policy control method 300 in accordance with some implementations. The method 300 begins at 302, where a first network device is configured as a first DVR controller and assigned a domain ID (e.g., domain ID 1). Processing continues to 304.

At 304, the first DVR controller is connected to a network-to-network (NNI) connection in a network (e.g., an SPB network). Processing continues to 306.

At 306, a second network device is configured as a second DVR controller and assigned a domain ID (e.g., domain ID 2). Processing continues to 308.

At 308, the second DVR controller is connected to the NNI connection. Processing continues to 310.

At 310, the second DVR controller is connected to the first DVR controller via a network (e.g., an L3 virtual switching network). Processing continues to 312.

At 312, DVR backbone messages are propagated from one or more of the DVR controllers to share routes (e.g., one or more of source, destination, and/or midpoint addresses, nodes, etc.) between the DVR controllers. For example, the backbone messages can include DVR backbone messages that include one or more of host route information, domain ID, L3VSN ID, or host MAC address. Processing continues to 314.

At 314, routes are installed at respective DVR controllers based on the accepted policies defined for the domain ID corresponding that the DVR controller is associated with. Installing can including adding a route including the domain ID to a list of accepted or denied routes and/or creating the list or table of accepted or denied routes first, if the list or table does not exist. Processing continues to 316.

At 316, routes are selectively accepted or denied (e.g., individual routes will added or not added based on whether the domain ID associated with those routes) based on the domain ID of the route and the accept policy or policies of the receiving DVR controller.

It will be appreciated that 302-316 can be repeated in whole or in part or may be performed in a different order than shown in FIG. 3.

Figure 4:
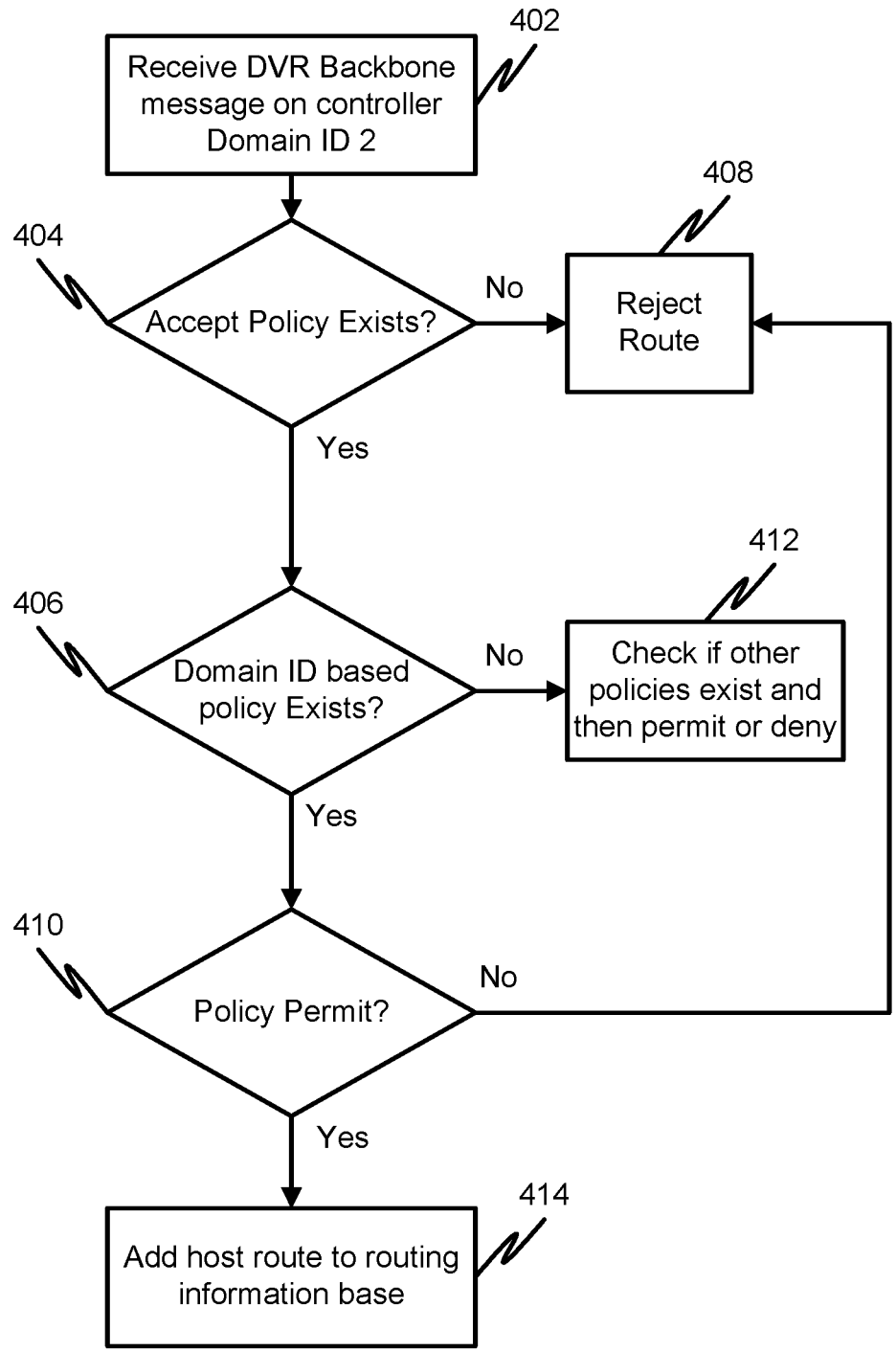
FIG. 4 is a flowchart showing an example domain ID access policy control method in accordance with some implementations.

FIG. 4 is a flowchart showing an example domain ID access policy control method 400 in accordance with some implementations. The method 400 begins at 402, where a DVR backbone message containing a domain ID for the route is received at a controller (e.g., DVR controller in domain with domain ID 2). Processing continues to 404.

At 404, it is determined whether an accept policy exists for the domain ID contained in the DVR backbone message. If so, processing continues to 406. If not, processing continues to 408.

At 406, it is determined whether a domain ID based policy exists. If so, processing continues to 410. If not, processing continues to 412.

At 408, the route is rejected. Rejecting a route can include taking no action on the route, sending a message to the source of the route that the route was rejected, etc. Processing continues to 410.

At 410, it is determined whether the policy permits the route. If so, processing continues to 414. If not, processing continues to 408.

At 412, existence of other policies is checked and then the route is permitted or denied based on the other policies. For example, the other policies can include policies to permit or reject a route based on ISID or other attribute associated with the route and/or backbone message.

At 414, the host route is added to the routing information base for the controller (e.g., the DVR controller associated with the domain having domain ID 2).

Figure 5:
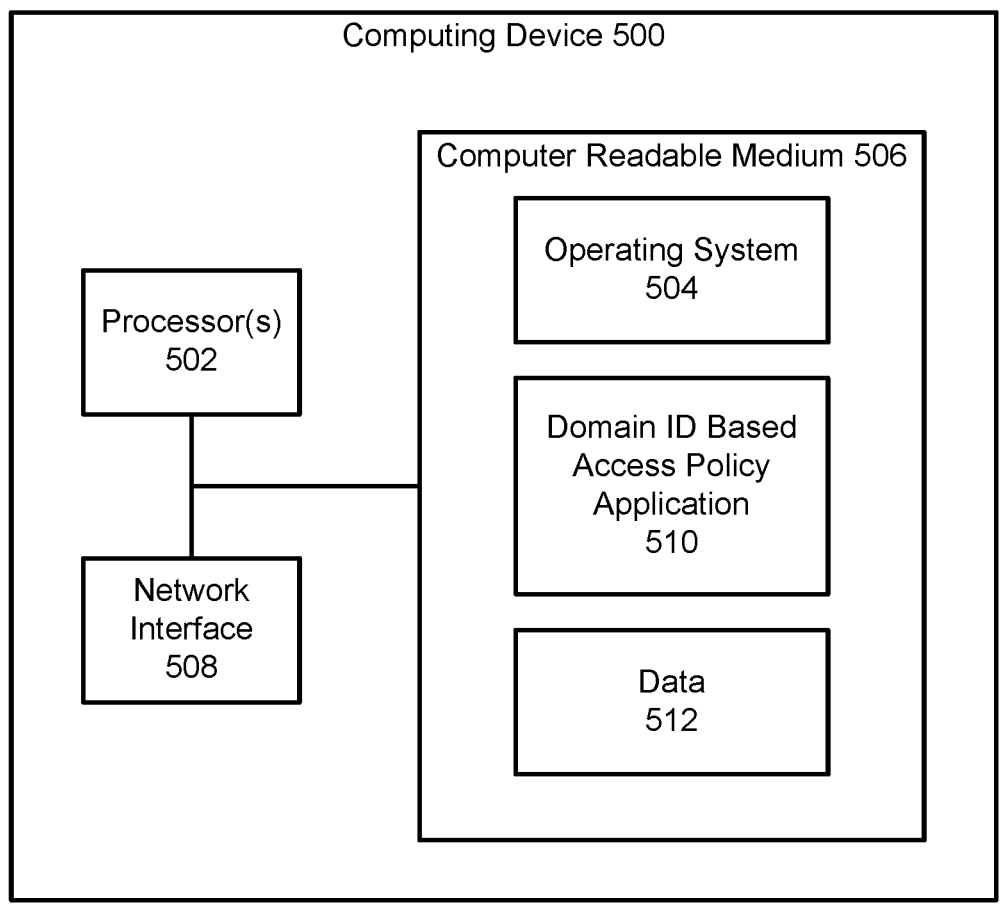
FIG. 5 is a diagram of an example computing device configured for domain ID access policy control in accordance with some implementations.

FIG. 5 is a diagram of an example computing device 500 in accordance with at least one implementation. The computing device 500 includes one or more processors 502, a nontransitory computer readable medium 506 and a network interface 508. The computer readable medium 506 can include an operating system 504, an application 510 for domain ID based access policy control and a data section 512 (e.g., for storing domain ID accept policies, etc.).

In operation, the processor 502 may execute the application 510 stored in the computer readable medium 506. The application 510 can include software instructions that, when executed by the processor, cause the processor to perform operations for domain ID based access policy control in accordance with the present disclosure (e.g., performing one or more of the sequences described above in connection with FIGS. 3 and 4).

The application program 510 can operate in conjunction with the data section 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for domain identifier (ID) based access policy control.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
assigning a first domain identifier (ID) to a first distributed virtual routing (DVR) controller
assigning a second domain ID to a second DVR controller, the second domain ID being different than the first domain ID;
coupling the first DVR controller to the second DVR controller via a network-to-network interface;
receiving a DVR backbone message associated with a route, wherein the DVR backbone message includes the first domain ID;
determining whether a domain ID based accept policy exists for the first domain ID;
if the domain ID based accept policy exists for the first domain ID, selectively accepting the route based on the domain ID based accept policy; and
if the domain ID based accept policy does not exist for the first domain ID, determining whether an accept policy exists for a service identifier included in the DVR backbone message;
accepting the route if the accept policy exists for the service identifier included in the DVR backbone message; and
rejecting the route if the accept policy does not exist for the service identifier included in the DVR backbone message.

2. The method of claim 1, wherein the network-to-network interface includes a network-to-network connection in a shortest path bridging network.

3. The method of claim 1, further comprising connecting the first DVR controller and the second DVR controller to a network.

4. The method of claim 1, further comprising connecting the first DVR controller and the second DVR controller to an L3 virtual switching network.

5. The method of claim 1, wherein the domain ID is a unique identifier associated with a group of DVR leaf nodes and DVR controller nodes.

6. The method of claim 1, wherein the DVR backbone message includes one or more of host route information domain ID, L3VSN ID, or host MAC address.

7. A system comprising:
one or more processors coupled to a non-transitory computer readable medium having stored thereon on software instructions that, when executed by the one or more processors, cause the one or more processors to perform operations including:
assigning a first domain ID to a first distributed virtual routing (DVR) controller;
assigning a second domain ID to a second DVR controller, the second domain ID being different than the first domain ID;
connecting the first DVR controller to the second DVR controller via a network-to-network interface;
receiving a DVR backbone message associated with a route, wherein the DVR backbone message includes the first domain ID;
determining whether a domain ID based accept policy exists for the first domain ID;
if the domain ID based accept policy exists for the first domain ID, selectively accepting the route based on the domain ID based accept policy; and
if the domain ID based accept policy does not exist for the first domain ID, determining whether an accept policy exists for a service identifier included in the DVR backbone message;
accepting the route if the accept policy exists for the service identifier included in the DVR backbone message; and
rejecting the route if the accept policy does not exist for the service identifier included in the DVR backbone message.

8. The system of claim 7, wherein the network-to-network interface includes a network-to-network connection in a shortest path bridging network.

9. The system of claim 7, wherein the operations further comprise connecting the first DVR controller and the second DVR controller to a network.

10. The system of claim 7, wherein the operations further comprise connecting the first DVR controller and the second DVR controller to an L3 virtual switching network.

11. The system of claim 7, wherein the domain ID is a unique identifier associated with a group of DVR leaf nodes and DVR controller nodes.

12. The system of claim 11, wherein the DVR backbone message includes host route information domain ID, L3VSN ID, or host MAC address.

13. A non-transitory computer readable medium having stored thereon software instructions that, when executed by one or more processors, cause the one or more processors to perform operations including:
    assigning a first domain ID to a first distributed virtual routing (DVR) controller;
    assigning a second domain ID to a second DVR controller, the second domain ID being different than the first domain ID;
    connecting the first DVR controller to the second DVR controller via a network-to-network interface;
    receiving a DVR backbone message associated with a route, wherein the DVR backbone message includes the first domain ID;
    determining whether a domain ID based accept policy exists for the first domain ID;
    if the domain ID based accept policy exists for the first domain ID, selectively accepting the route based on the domain ID based accept policy; and
    if the domain ID based accept policy does not exist for the first domain ID, determining whether an accept policy exists for a service identifier included in the DVR backbone message;
    accepting the route if the accept policy exists for the service identifier included in the DVR backbone message; and
    rejecting the route if the accept policy does not exist for the service identifier included in the DVR backbone message.

14. The non-transitory computer readable medium of claim 13, wherein the network-to-network interface includes a network-to-network connection in a shortest path bridging network.

15. The non-transitory computer readable medium of claim 13, wherein the operations further comprise connecting the first DVR controller and the second DVR controller to a network.

16. The non-transitory computer readable medium of claim 13, wherein the operations further comprise connecting the first DVR controller and the second DVR controller to an L3 virtual switching network.

17. The non-transitory computer readable medium of claim 13, wherein the domain ID is a unique identifier associated with a group of DVR leaf nodes and DVR controller nodes.

18. The non-transitory computer readable medium of claim 17, wherein the DVR backbone message includes host route information domain ID, L3VSN ID, or host MAC address.

* * * * *